United States Patent [19]

Beck et al.

[11] Patent Number: 4,483,218
[45] Date of Patent: Nov. 20, 1984

[54] CLAMPING DEVICE FOR A SAW BLADE IN A MACHINE FOR WORKING ON SAWS

[75] Inventors: Ernst Beck, Maselheim; Peter Lenard, Biberach an der Riss, both of Fed. Rep. of Germany

[73] Assignee: Vollmer Werke Maschinenfabrik GmbH, Biberach an der Riss, Fed. Rep. of Germany

[21] Appl. No.: 520,735

[22] Filed: Aug. 5, 1983

[30] Foreign Application Priority Data

Aug. 14, 1982 [DE] Fed. Rep. of Germany ....... 3230278

[51] Int. Cl.³ ............................................ B23D 63/14
[52] U.S. Cl. .................................................. 76/78 R
[58] Field of Search ...................... 76/78 R, 79, 48, 37

[56] References Cited

U.S. PATENT DOCUMENTS 3,717,052  2/1973  McKinney ............................. 76/48
4,102,224  7/1978  Wright .................................... 76/79
4,436,000  3/1984  Lenard et al. .......................... 76/37

FOREIGN PATENT DOCUMENTS 2535583  2/1977  Fed. Rep. of Germany .......... 76/37

*Primary Examiner*—Roscoe V. Parker
*Attorney, Agent, or Firm*—Burns, Doane, Swecker & Mathis

[57] ABSTRACT

Two clamping jaws (30, 32) disposed opposite each other and operable by fluid pressure are connected to each other by gearing (38, 40, 50) which guides them symmetrically with respect to a central plane (B). The gearing (38, 40, 50) comprises two racks (38, 40) meshing with a pinion (50) disposed between them and each secured to a respective one of the clamping jaws (30 and 32). The axis (48) of the pinion (50) is adjustable transversely of the central plane (B) to change the location thereof. In this manner any saw blade (10) may be clamped in the area of each individual tooth (12) exactly symmetrically with respect to the central plane thereof.

12 Claims, 3 Drawing Figures

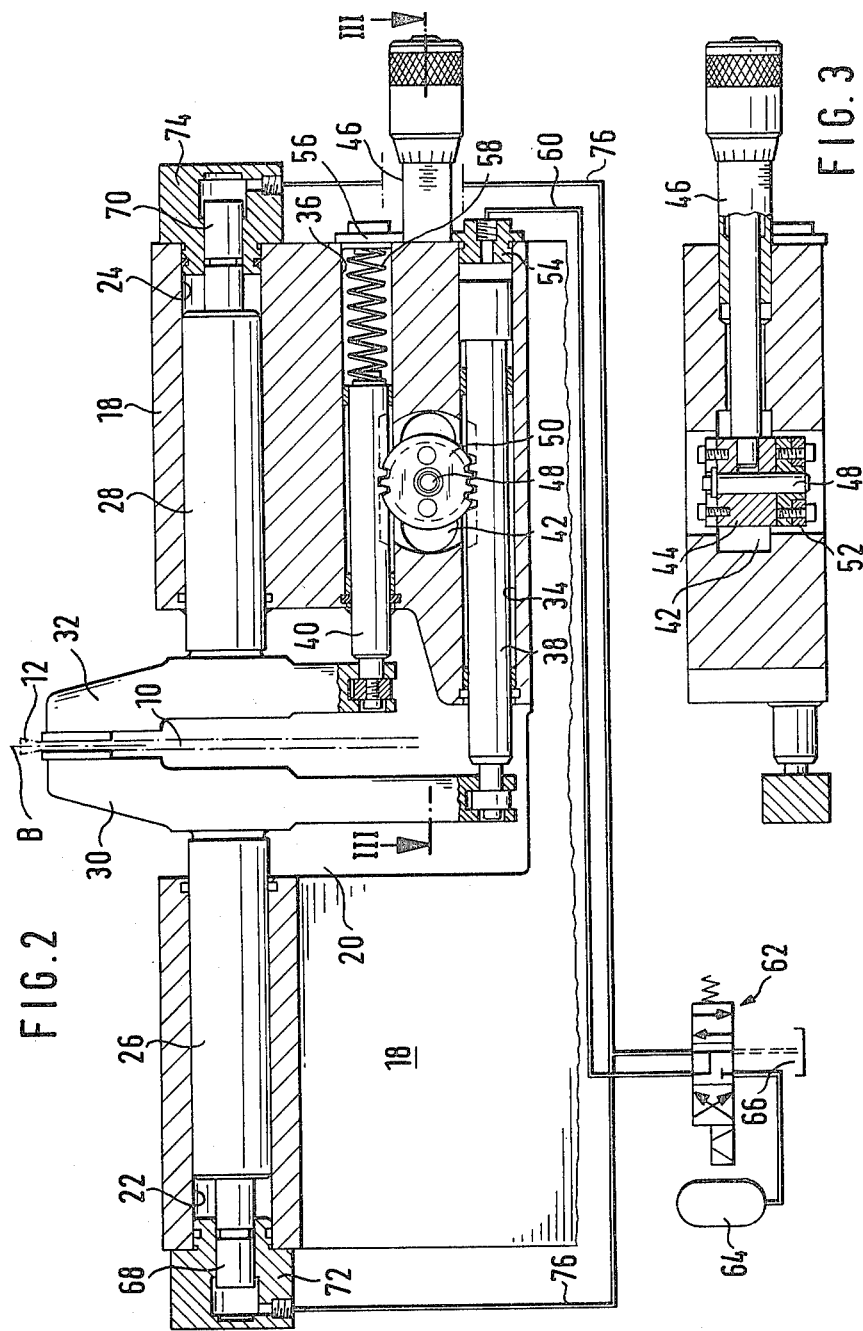

CLAMPING DEVICE FOR A SAW BLADE IN A MACHINE FOR WORKING ON SAWS

The invention relates to a clamping device for a saw blade in a machine for working on saws, comprising a pair of clamping jaws disposed opposite each other, adapted to be operated by fluid pressure and, in addition, to be supported mechanically so as to hold the saw blade clamped between them in a certain position.

A known clamping device of this kind (DE No. 25 35 583 A1) is based on the idea that, during sawing, the saw blade is clamped in its central area so as not to be displaceable axially and that, for this reason, it should also be clamped against axial displacement in its central area during grinding or any other processing of the saw blade in a machine devised for working on saw blades. If the saw blade should be out of the true plane in its marginal zone provided with teeth, for instance being undulated, this is not to be allowed for. Instead, the known clamping device is to be used for clamping in such manner that the axial position of the clamping area as given with a relaxed saw blade and being out of true as regards the plane, is maintained as accurately as possible. Any working, particularly resharpening of the teeth by a grinding wheel then is to be carried out in correspondence with the axial position of the center, regardless of the out of the true plane condition. As a consequence all sharpened teeth will be symmetrical with respect to the central plane as fixed by the center of the saw blade.

Proceeding thus, it cannot be avoided, however, that the flanks and chamfers of the teeth in the vicinity of which the saw blade is out of the true plane and which have been subjected to working according to this principle, result as asymmetrical teeth with respect to the central plane of the respective teeth which central plane differs from that of the center of the saw blade. Chamfers are inclined grinding surfaces replacing the lateral edges which at first were sharp after grinding of the lateral flanks and of the back of the tooth located between them. More or less distinct chamfers have proved to be successful above all in circular saws for working on metal, yet only provided they are arranged symmetrically at great precision with respect to the central plane of the respective tooth.

It is an object of the invention to develop a clamping device of the kind specified initially such that it will be adapted to clamp a saw blade in the area of each individual tooth exactly symmetrically with respect to the central plane of the respective tooth.

This central plane extends at right angles with respect to the axis of the saw blade and normally is determined by the machine for working on saws, for instance by the fact that the central plane must contain an axis which extends at right angles with respect to the axis of the saw blade and along which a grinding wheel support reciprocates and about which the grinding wheel support is pivotable. Within the limits of the object of the invention, exact symmetrical clamping with respect to the given central plane is to be warranted also if the saw blade is of different thicknesses in the various zones to be clamped one after another and/or if saw blades having varying nominal thicknesses are being processed successively.

The object is met, in accordance with the invention, in that the two clamping jaws are connected by a gearing which has a fixed point and guides the clamping jaws symmetrically with respect to a central plane.

Conveniently, the fixed point of the gearing is adjustable transversely of the central plane to change the location thereof. This permits compensation of inaccuracies caused, for example, by the structure of the machine for working on saws or possibly resulting from the assembly of the clamping device. By readjusting the fixed point it may be obtained, in particular that the central plane which respect to which the clamping jaws are symmetrical in any of their positions, contains the axis about which the grinding wheel support is pivotable in the manner described above.

In a preferred embodiment of the invention the gearing comprises two racks which mesh with a pinion arranged between them and which are each secured to a respective one of the clamping jaws.

Conveniently, the pinion is formed with two toothings which are disposed axially beside each other and adjustable angularly with respect to each other. In this manner any backlash between the pinion and the two racks meshing with the same can be avoided.

It is also convenient if one of the two racks comprises a pressure fluid operated piston, which piston may be provided specifically to cause spreading apart of the two clamping jaws.

It is convenient as well to have one of the two racks operate against a spring. A spring especially may serve to apply the clamping jaws at slight pressure against the saw blade so that the latter is adapted to be advanced gradually by one or more tooth pitches by a known feeding means but does not tend to move beyond a given feed terminal position under its own inertia.

In the embodiment comprising a pinion between two racks the adjustability of the fixed point of the gearing conveniently may be realized by supporting the pinion on an axis which is adjustable transversely of the central plane.

The invention will be described further, by way of example, with reference to the accompanying drawings, in which:

FIG. 2 is a sectional elevation along line II—II in FIG. 1;

FIG. 3 is a sectional elevation along line III—III in FIG. 2.

Figure 1:
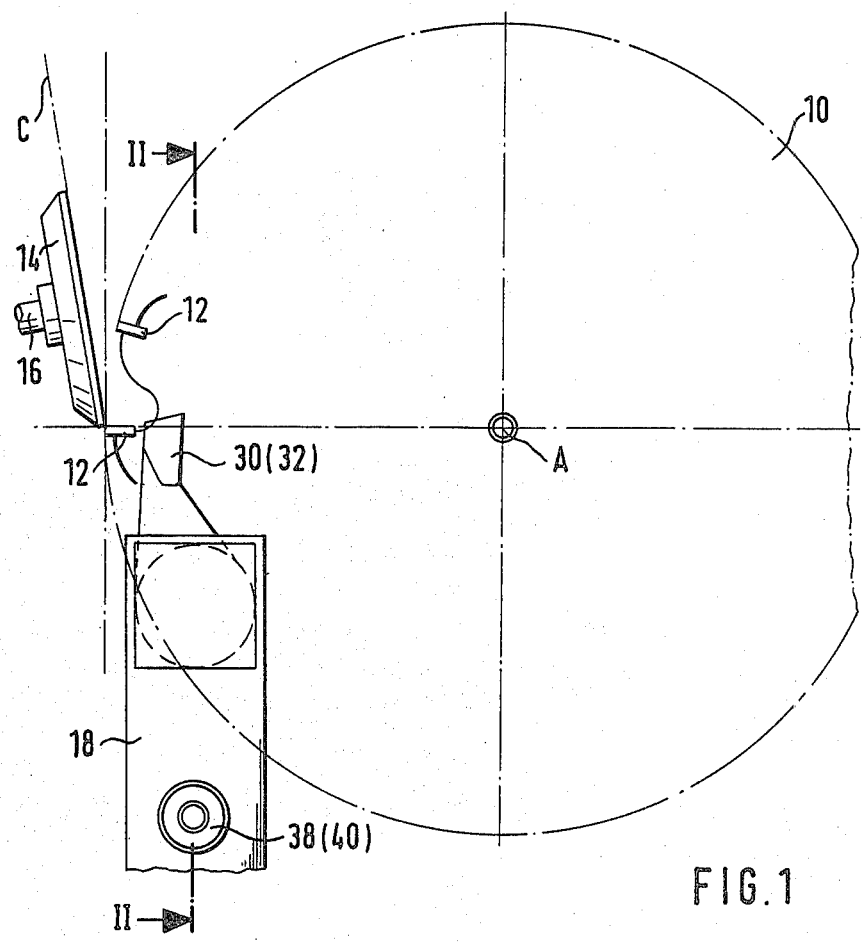
FIG. 1 is a side elevational view of a saw blade and a clamping device according to the invention.

The apparatus shown has the task of clamping a saw blade 10 which is supported in customary manner for rotation about its axis A in a machine for working on saws, so as to finish one tooth 12 each, and then to release the clamping in order that the saw blade may be indexed by one tooth pitch, for instance by a conventional feeding means. The saw blade 10 which is clamped in the vicinity of a tooth 12 is to be retained in the range of this tooth exactly symmetrical with respect to a central plane B. As indicated in FIG. 1, the working on a respective tooth 12 may reside in grinding its back by a plate-like grinding wheel 14. The grinding wheel 14 is attached to a grinding spindle 16 and adapted to be pivoted together with said spindle and the support thereof (not shown) about an axis C which lies in the central plane B so that, instead of the back of the tooth, chamfers for example may be ground between the back of the tooth and the two adjacent lateral flanks of the respective tooth 12.

The clamping device comprises a stationary housing 18 formed with a recess 20 by which it straddles the saw blade 10. The housing 18 includes a bore each 22 and 24, respectively, at either side of the saw blade 10. These bores extend at right angles with respect to the central plane B, are aligned with each other, and each contain a displaceable tappet 26 and 28, respectively. A clamping jaw each 30 and 32 is secured to the ends of the two tappets 26 and 28, respectively, facing each other.

The housing has two further bores 34 and 36 extending in parallel and spaced from each other and also in parallel with the bores 22 and 24. They each guide a substantially cylindrical rack 38 and 40, respectively. Each rack 38 and 40 is secured to the respective one of the clamping jaws 30 and 32. Between the two racks 38 and 40 the housing 18 is formed with a recess 42 of oblong shape in a direction parallel to the bores mentioned and containing a slide member 44 which is adjustable in parallel with the bores in question and thus at right angles with respect to the central plane by means of a micrometer screw 46 attached to the slide member. An axis 48 is supported for rotation in the slide member 44 and extends transversely of the common central plane of the two bores 34 and 36. A pinion 50 comprising two identical toothings in axial side-by-side relationship is fixed on the axis 48. One of the toothings is formed in the pinion 50 itself, while the other one is formed in a ring 52 secured to the pinion for angular adjustment. The pinion 50 meshes with both racks 38 and 40; its two toothings are so adjusted that they engage in the teeth of the racks without backlash.

Both racks 38 and 40 are guided in sealing piston-like fashion in the respective bores 34 and 36. At its end remote from the central plane B the bore 34 is closed tightly by an inlet plug 54. Bore 36, on the other hand, is closed in non-sealing manner, at the end remote from the central plane B, by a support plate 56 for a spring 58. As the spring 58 is embodied by a compression spring clamped between the support plate 56 and the rack 40, it constantly tends to move the clamping jaw 32 toward the central plane B. The spring 58 also urges clamping jaw 30 toward the central plane B by virtue of the connection established by the pinion 50 between the two racks 38 and 40. Therefore, both clamping jaws 30 and 32 engage the saw blade 10 under gentle pressure produced by the spring 58, unless they are subject to any other actuating forces.

The section of bore 34 limited, on the one hand, by the rack 38 and, on the other hand, by the inlet plug 54 may be connnected selectively to an hydraulic pressure fluid reservoir 64 by way of an electromagnetically operable multiway valve 62 or, as shown in FIG. 2, to a pressureless return flow container 66. Upon connecting the section in question of bore 34 to the pressure fluid reservoir 64 a force acts on the piston-like rack 38 to overcome that of the spring 58, thus spreading the two clamping jaws 30 and 32, provided the latter are not subjected to additional forces tending to move them toward the central plane B.

Such additional forces may be generated by having a piston each 68 and 70, respectively, formed at the respective ends of the tappets 26 and 28 which are remote from the central plane B. The pistons operate in a cylinder each 72 and 74, respectively, fixed to the housing 18. The cylinders 72 and 74 are interconnected by a line 76 which also may be connected selectively through the multiway valve 62 either to the pressure fluid reservoir 64 or, as shown in FIG. 2, to the return flow container 66. The multiway valve 62 is so designed that the two cylinders 72 and 74 cannot communicate with the pressure fluid reservoir 64 unless the bore 34 is connected to the return flow container 66, and vice versa. However, as shown in FIG. 2, both cylinders 72 and 74 as well as the bore 34 may be connected at the same time to the return flow container 66.

The latter switching condition is set when the saw blade 10 is to be rotated about axis A by one tooth pitch, for instance, i.e. the spacing between two adjacent teeth 12, against small frictional resistance as created by the clamping jaws 30 and 32 under the influence of the spring 58 alone. On the other hand, the cylinders 72 and 74 are pressurized for working on a tooth 12 so that a much stronger hydraulic contact pressure is superimposed over the mechanical contact pressure provided by the spring 58, thus safely and positively holding the saw blade 10. If the saw blade 10, by contrast, is to be replaced by another one after a working process, the multiway valve 62 is shifted to such position that only bore 34 will be pressurized and consequently both clamping jaws 30 and 32 will be moved apart as far as possible. In any case, the gearing constituted by the two racks 38 and 40 and by the pinion 50 meshing with them and whose axis 48 is a fixed point, always causes the two clamping jaws 30 and 32 to be spaced alike from the central plane B. If any correction should prove necessary, the axis 48, in other words the fixed point of the gearing, may be adjusted in one direction or the other by means of the micrometer screw 46.

What is claimed is:

1. A clamping device for a saw blade in a machine for working on saws, comprising a pair of opposed clamping jaws (30, 32) adapted to be operated by fluid pressure and in addition to be supported mechanically so as to hold the saw blade (10) clamped between them in a certain position, characterized in that the two clamping jaws (30, 32) are connected by a gearing (38, 40, 50) which has a fixed point (axis 48) and guides the clamping jaws (30, 32) symmetrically with respect to a central plane (B).

2. The clamping device as claimed in claim 1, characterized in that the fixed point (axis 48) of the gearing (38, 40, 50) is adjustable transversely of the central plane (B) to change the location thereof.

3. The clamping device as claimed in claim 1, characterized in that the gearing (38, 40, 50) comprises two racks (38, 40) meshing with a pinion (50) disposed between them and each secured to a respective one of the clamping jaws (30 and 32).

4. The clamping device as claimed in claim 3, characterized in that the pinion (50) comprises two toothings disposed beside each other axially and angularly adjustable with respect to each other.

5. The clamping device as claimed in claim 3, characterized in that one of the two racks (38, 40) comprises a fluid pressure operable piston.

6. The clamping device as claimed in claim 3, characterized in that one of the two racks (38, 40) is operative against a spring (58).

7. The clamping device as claimed in claim 2, characterized in that a pinion (50) is supported on the axis (48) which is adjustable transversely of the central plane (B).

8. The clamping device as claimed in claim 4, characterized in that one of the two racks (38, 40) comprises a fluid pressure operable piston.

9. The clamping device as claimed in claim 4, characterized in that one of the two racks (38, 40) is operative against a spring (58).

10. The clamping device as claimed in claim 5, characterized in that one of the two racks (38, 40) is operative against a spring (58).

11. The clamping device as claimed in claim 8, characterized in that one of the two racks (38, 40) is operative against a spring (58).

12. The clamping device as claimed in claim 3, characterized in that the pinion (50) is supported on an axis (48) which is adjustable transversely of the central plane (B).

* * * * *